US009898171B2

United States Patent
Ito

(10) Patent No.: US 9,898,171 B2
(45) Date of Patent: Feb. 20, 2018

(54) INFORMATION PROCESSING APPARATUS, METHOD OF CONTROLLING A LOCK SCREEN DISPLAYED WHILE THE INFORMATION PROCESSING APPARATUS IS LOCKED, AND RECORDING MEDIUM

(71) Applicant: KONICA MINOLTA, INC., Chyoda-ku, Tokyo (JP)

(72) Inventor: Hiroyasu Ito, Okazaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 224 days.

(21) Appl. No.: 14/747,229

(22) Filed: Jun. 23, 2015

(65) Prior Publication Data

US 2015/0370438 A1   Dec. 24, 2015

(30) Foreign Application Priority Data

Jun. 24, 2014 (JP) ................................. 2014-129736

(51) Int. Cl.
*G06F 3/0488* (2013.01)
*G06F 3/0484* (2013.01)
(Continued)

(52) U.S. Cl.
CPC .......... *G06F 3/0484* (2013.01); *G06F 3/0482* (2013.01); *G06F 3/0488* (2013.01);
(Continued)

(58) Field of Classification Search
CPC ........ G06F 3/0488; G06F 3/017; G06F 21/31; G06F 3/04817; G06F 2221/2147;
(Continued)

(56) References Cited

U.S. PATENT DOCUMENTS 9,578,197 B2*  2/2017  Lee .................... H04N 1/00949
2009/0316186 A1  12/2009  Higashi et al.
(Continued)

FOREIGN PATENT DOCUMENTS

| CN | 101213559 A | 7/2008 |
|---|---|---|
| EP | 1 914 656 | 4/2008 |

(Continued)

OTHER PUBLICATIONS

Extended European Search Report issued in corresponding European Patent Application No. 15172510.8-1870, dated Nov. 4, 2015 (6 pages).

(Continued)

*Primary Examiner* — Tadeese Hailu
(74) *Attorney, Agent, or Firm* — Buchanan Ingersoll & Rooney PC

(57) ABSTRACT

An information processing apparatus includes: a touch-enabled display; a lock portion that locks the information processing apparatus; a display controller that displays a lock screen on the display, the lock screen having a first icon for unlock and one or more second icons each representing a function, and that refreshes the lock screen, when a user moves the first icon, such that the first icon is present at a different position; an unlock portion that unlocks the information processing apparatus; a recognition portion that recognizes a function as being selected, the function being represented by the one second icon or one of the second icons being present at the position where the user releases the first icon; a user information obtaining portion that obtains user information; and an authentication portion that conducts user authentication with the obtained user information while the user is moving the first icon.

16 Claims, 18 Drawing Sheets

(51) Int. Cl.
*G06F 3/0481* (2013.01)
*G06F 3/0482* (2013.01)
*H04N 1/00* (2006.01)
*H04N 1/44* (2006.01)
*G06F 21/32* (2013.01)

(52) U.S. Cl.
CPC ...... *G06F 3/04817* (2013.01); *G06F 3/04883* (2013.01); *G06F 21/32* (2013.01); *H04N 1/00392* (2013.01); *H04N 1/00395* (2013.01); *H04N 1/00411* (2013.01); *H04N 1/00437* (2013.01); *H04N 1/00474* (2013.01); *H04N 1/00514* (2013.01); *H04N 1/4433* (2013.01); *H04N 2201/0094* (2013.01)

(58) Field of Classification Search
CPC .............. G06F 3/04883; G06F 21/316; G07C 9/00142; H04L 63/0861; H04W 12/06
See application file for complete search history.

(56) References Cited

U.S. PATENT DOCUMENTS

| | | | | |
|---|---|---|---|---|
| 2010/0263031 | A1* | 10/2010 | Tsuchiya | G06F 21/32 726/7 |
| 2010/0269040 | A1 | 10/2010 | Lee | |
| 2013/0086522 | A1 | 4/2013 | Shimazu et al. | |
| 2013/0239059 | A1* | 9/2013 | Chen | G06F 3/0488 715/835 |
| 2014/0009417 | A1 | 1/2014 | Sugimoto | |
| 2014/0109024 | A1* | 4/2014 | Miyazaki | G06F 3/04883 715/863 |
| 2014/0115694 | A1* | 4/2014 | Fadell | G06F 21/316 726/19 |
| 2014/0143856 | A1* | 5/2014 | Wu | G06F 21/31 726/16 |
| 2014/0176991 | A1* | 6/2014 | Yun | H04W 64/00 358/1.15 |
| 2014/0210728 | A1* | 7/2014 | Busse | G06F 9/4443 345/173 |
| 2014/0237378 | A1* | 8/2014 | Gonen | H04M 1/72519 715/745 |
| 2014/0304809 | A1* | 10/2014 | Fadell | G06F 21/316 726/19 |
| 2015/0145763 | A1* | 5/2015 | Kamide | G06F 3/011 345/156 |
| 2015/0149375 | A1* | 5/2015 | Thompson | G06Q 50/01 705/319 |
| 2015/0334570 | A1 | 11/2015 | Nade | |

FOREIGN PATENT DOCUMENTS

| | | |
|---|---|---|
| GB | 2486707 A | 6/2012 |
| JP | 7-104915 A | 4/1995 |
| JP | 2003-157132 A | 5/2003 |
| JP | 2005-149279 A | 6/2005 |
| JP | 2010-002999 A | 1/2010 |
| JP | 2010-541046 A | 12/2010 |
| JP | 4800312 B2 | 10/2011 |
| JP | 2012-133787 A | 7/2012 |
| JP | 2013-065289 A | 4/2013 |
| JP | 2013-093020 A | 5/2013 |
| JP | 2013-232197 A | 11/2013 |
| JP | 2014-007509 A | 1/2014 |
| JP | 2014-016795 A | 1/2014 |
| JP | 2014-099071 A | 5/2014 |
| WO | 2006-064698 A1 | 6/2006 |

OTHER PUBLICATIONS

Office Action (Notification of Reasons for Refusal) dated Dec. 6, 2016, by the Japanese Patent Office in corresponding Japanese Patent Application No. 2014-129736, and an English Translation of the Office Action. (7 pages).

Office Action (Communication pursuant to Article 94(3) EPC) dated Oct. 4, 2017 by the European Patent Office in corresponding European Patent Application No. 15 172 510.8.

Office Action (The First Office Action) dated Aug. 1, 2017 by the State Intellectual Property Office of the People'Republic of China in corresponding Chinese Patent Application No. 201510347366.0 and an English Translation of the Office Action. (16 page).

\* cited by examiner

| Table for determining the status of a touch gesture | | Previous status of a touch gesture | |
|---|---|---|---|
| | | Touching | No touching |
| Current status of a touch gesture | Touching | Keep touching | Just started touching |
| | No touching | Just ended touching | Keep no touching |

The distance from the home position to a function icon representing a selected function: X
The distance from the home position to a position at which the unlock icon is currently present: Y

| The distance Traveled by the Unlock Icon (Y/X)[%] | Function Icons Representing Permitted Functions Will be Displayed | Function Icons Representing Prohibited Functions Will be Displayed | Background Image Will be Displayed |
|---|---|---|---|
| 0~24 | At an opacity level of 100% | At an opacity level of 100% | In a grayout manner |
| 25~49 | At an opacity level of 100% | At an opacity level of 60% | At a opacity level of 30%, a main screen of the selected function |
| 50~74 | At an opacity level of 100% | At an opacity level of 30% | At a opacity level of 60%, a main screen of the selected function |
| 75~124 | At an opacity level of 100% | At an opacity level of 10% | At a opacity level of 90%, a main screen of the selected function |
| 125~ | At an opacity level of 100% | At an opacity level of 100% | In a grayout manner |

Opacity Level: 100% Clear ◀▶ Obscure 0%

FIG.15

| Status of a Touch on the Unlock Icon | Position of the Unlock Icon | Status of User Authentication | |
|---|---|---|---|
| | | Unauthenticated | Authenticated |
| No touching | — | Display a lock screen | — |
| Touching | Area 1 | Display a lock screen and function icons | ↓ |
| | Area 2 | Display a lock screen and function icons | ↓ |
| | Area 3(n) | Display a lock screen and function icons | Display a dedicated screen |
| | Area 4(n) | Display a lock screen and function icons | Display a dedicated screen |
| | Area 5 | Display a lock screen | ↓ |
| Just ended touching | Area 1 | Display a lock screen | ↓ |
| | Area 2 | Display a lock screen | ↓ |
| | Area 3(n) | Display a lock screen | ↓ |
| | Area 4(n) | Display a login requesting screen | Display a main screen of a selected function |
| | Area 5 | Display a lock screen | ↓ |

FIG.17A

| Status of a Touch on the Unlock Icon | Position of the Unlock Icon | Status of User Authentication | |
|---|---|---|---|
| | | Unauthenticated | Authenticated |
| No touching | — | Display a lock screen | — |
| Touching | Area 1 | Display a lock screen and function icons | ← |
| | Area 2 | Display a lock screen and function icons | ← |
| | Area 3(n) | Display a lock screen, function icons, and subordinate icons | Display a lock screen, function icons, and subordinate icons representing only the user's available options |
| | Area 4(n) | Display a lock screen, function icons, and subordinate icons | Display a lock screen, function icons, and subordinate icons representing only the user's available options |
| | Area 5 | Display a lock screen and function icons | ← |
| Just ended touching | Area 1 | Display a lock screen | ← |
| | Area 2 | Display a lock screen | ← |
| | Area 3(n) | Display a lock screen | ← |
| | Area 4(n) | Display a login requesting screen and hold the screen corresponding to the selected subordinate icon behind the login requesting screen | Display a main screen of the selected function or the screen corresponding to the selected subordinate icon |
| | Area 5 | Display a lock screen | ← |

FIG.17B

| Status of a Touch on the Unlock Icon | Position of the Unlock Icon | Status of User Authentication | |
|---|---|---|---|
| | | Unauthenticated | Authenticated |
| No touching | — | Display a lock screen | — |
| Touching | Area 1 | Display a lock screen and function icons | ↓ |
| | Area 2 | Display a lock screen and function icons | ↓ |
| | Area 3(n) | Display a lock screen and function icons | Display a lock screen, function icons, and a background image |
| | Area 4(n) | Display a lock screen and function icons | Display a lock screen, function icons, and a background image |
| | Area 5 | Display a lock screen and function icons | ↓ |
| Just ended touching | Area 1 | Display a lock screen | ↓ |
| | Area 2 | Display a lock screen | ↓ |
| | Area 3(n) | Display a lock screen | ↓ |
| | Area 4(n) | Display a login requesting screen | Display a main screen of the selected function |
| | Area 5 | Display a lock screen | ↓ |

FIG.17C

INFORMATION PROCESSING APPARATUS, METHOD OF CONTROLLING A LOCK SCREEN DISPLAYED WHILE THE INFORMATION PROCESSING APPARATUS IS LOCKED, AND RECORDING MEDIUM

This application claims priority under 35 U.S.C. § 119 to Japanese Patent Application No. 2014-129736 filed on Jun. 24, 2014, the entire disclosure of which is incorporated herein by reference in its entirety.

BACKGROUND OF THE INVENTION

Field of the Invention

The present invention relates to an information processing apparatus such as a personal computer, a tablet computer terminal, and an image processing apparatus, a method of controlling a lock screen displayed while the information processing apparatus is locked, and a non-transitory computer-readable recording medium.

Description of the Related Art

The following description sets forth the inventor's knowledge of related art and problems therein and should not be construed as an admission of knowledge in the prior art.

Users operate portable terminal apparatuses such as smartphones and tablet computer terminals with touch gestures on touch panels provided on their displays. In order to avoid waking a portable terminal apparatus from standby state with an unintended touch gesture on a standby screen, it is very common for users to disable all touch gestures except for specified touch gestures including unlock gestures by locking the portable terminal apparatus.

Furthermore, portable terminal apparatuses are commonly configured to display, while they are locked, a lock screen on their displays along with an unlock icon being present on the lock screen so that users can unlock them by touching and moving (swiping) the unlock icon on the lock screen.

In this configuration, after unlocking a portable terminal apparatuses with a swipe gesture, users need to select a desired application again; in other words, they need to take more than one step, unlocking and application selecting, in order to use a desired application. This is not user-friendly.

As a solution to the problem, Japanese Unexamined Patent Publication No. 2013-065289 proposes a technique of: displaying an unlock icon and application icons each corresponding to an application on a lock screen; and activating a desired application by releasing the unlock icon on an application icon representing this application. This technique allows users to finish unlocking and application selecting and activating by taking only one gesture, which apparently contributes to the user-friendliness.

Information processing apparatuses such as multi-function peripherals (MFP), i.e., multifunctional digital image processing apparatuses having copier function, scanner function, facsimile function, and other functions were recognized as copier-based apparatuses having other functions, conventionally. Recent years, they are recognized as integrated communication apparatuses having many essential printer and scanner functions such as Web printing and scanned data transmission and many of them are configured, as in a conventional manner, to initially display a function selecting screen instead of a copier function screen.

Many of them are also capable of working with smartphones and tablet computer terminals and an environment in which users operate information processing apparatuses such as MFPs, smartphones, and tablet computer terminals has become seamless.

With the above-described background technology, there is a discussion about a MFP, for example, that requires user authentication. After a user logs out by operating an operation panel, such a MFP is locked to fall in standby state and displays an unlock icon and function icons on a screen so that users can finish unlocking and function selecting by taking only one gesture that is touching and moving the unlock icon and releasing it on one of the function icons. The MFP, however, has a problem as described below.

As previously mentioned, the MFP requires user authentication; despite the technique that permits unlocking and function selecting by taking only one gesture, users are required to take an extra step for user authentication in order to use a desired function. This is still not user-friendly.

This is not just about MFPs as described above and the same is true on any other information processing apparatuses that require user authentication.

SUMMARY OF THE INVENTION

The present invention has been made to solve the above-described problem. It is an object of the present invention to provide an information processing apparatus having a security system that requires user authentication and unlocks the information processing apparatus when a user touches and moves an unlock icon on a lock screen displayed on its display, the information processing apparatus being more user-friendly without requiring the user to take an extra step for user authentication after unlocking. It is another object of the present invention to provide a method of controlling a lock screen displayed on the information processing apparatus. It is yet another object of the present invention to provide a non-transitory computer-readable recording medium.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

A first aspect of the present invention relates to an information processing apparatus including:

a touch-enabled display;

a lock portion that puts the information processing apparatus in standby state and disables all touch gestures except for specified touch gestures including unlock gestures, by locking the information processing apparatus after user logout;

a display controller that performs the following operations: initially displaying a lock screen on the display, the lock screen indicating that the information processing apparatus is presently locked, the lock screen having a first icon for unlock and one or more second icons each representing a function of the information processing apparatus; and refreshing the lock screen initially displayed on the display such that the first icon is present at a different position on the lock screen, when a user moves the first icon on the display;

an unlock portion that unlocks the information processing apparatus based on touching and moving the first icon on the lock screen by the user that intends to log in;

a recognition portion that recognizes a function as being selected by the user, the function being represented by the one second icon or one of the second icons being present at the position where the user releases the first icon;

a user information obtaining portion that obtains user information for identifying the user without requiring user input; and an authentication portion that conducts user authentication on the user with the user information obtained by the user information obtaining portion, while the user is moving the first icon, wherein the display controller changes the lock screen on the display to a dedicated screen of the user if user authentication is finished by the authentication portion while the user is moving the first icon.

A second aspect of the present invention relates to a display control method of controlling a lock screen displayed, the display control method to be implemented by an information processing apparatus including a touch-enabled display, the display control method including:

putting the information processing apparatus in standby state and disable all touch gestures except for specified touch gestures including unlock gestures, by locking the information processing apparatus after user logout;

performing the following operations: initially displaying a lock screen on the display, the lock screen indicating that the information processing apparatus is presently locked, the lock screen having a first icon for unlock and one or more second icons each representing a function of the information processing apparatus; and refreshing the lock screen initially displayed on the display such that the first icon is present at a different position on the lock screen, when a user moves the first icon on the display;

unlocking the information processing apparatus based on touching and moving the first icon on the lock screen by the user that intends to log in;

recognizing a function as being selected by the user, the function being represented by the one second icon or one of the second icons being present at the position where the user releases the first icon;

obtaining user information for identifying the user without requiring user input; and conducting user authentication on the user with the user information being obtained, while the user is moving the first icon, wherein the lock screen on the display changes a dedicated screen of the user if user authentication is finished while the user is moving the first icon.

A third aspect of the present invention relates to a non-transitory computer-readable recording medium storing a display control program for an information processing apparatus including a touch-enabled display, the display control program for making a CPU of the information processing apparatus execute:

putting the information processing apparatus in standby state and disable all touch gestures except for specified touch gestures including unlock gestures, by locking the information processing apparatus after user logout;

performing the following operations: initially displaying a lock screen on the display, the lock screen indicating that the information processing apparatus is presently locked, the lock screen having a first icon for unlock and one or more second icons each representing a function of the information processing apparatus; and refreshing the lock screen initially displayed on the display such that the first icon is present at a different position on the lock screen, when a user moves the first icon on the display;

unlocking the information processing apparatus based on touching and moving the first icon on the lock screen by the user that intends to log in;

recognizing a function as being selected by the user, the function being represented by the one second icon or one of the second icons being present at the position where the user releases the first icon;

obtaining user information for identifying the user without requiring user input; and conducting user authentication on the user with the user information being obtained, while the user is moving the first icon, wherein the lock screen on the display changes to a dedicated screen of the user if user authentication is finished while the user is moving the first icon.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying drawings, in which:

FIG. 15 is a table that determines opacity levels of a background image and others depending on the distance traveled by the unlock icon.

FIGS. 17A to 17C each is a table that determines a screen to be displayed on the display depending on the status of a touch gesture on the unlock icon, the position of the unlock icon, the status of user authentication, and others.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described with reference to the accompanying drawings.

Figure 1:
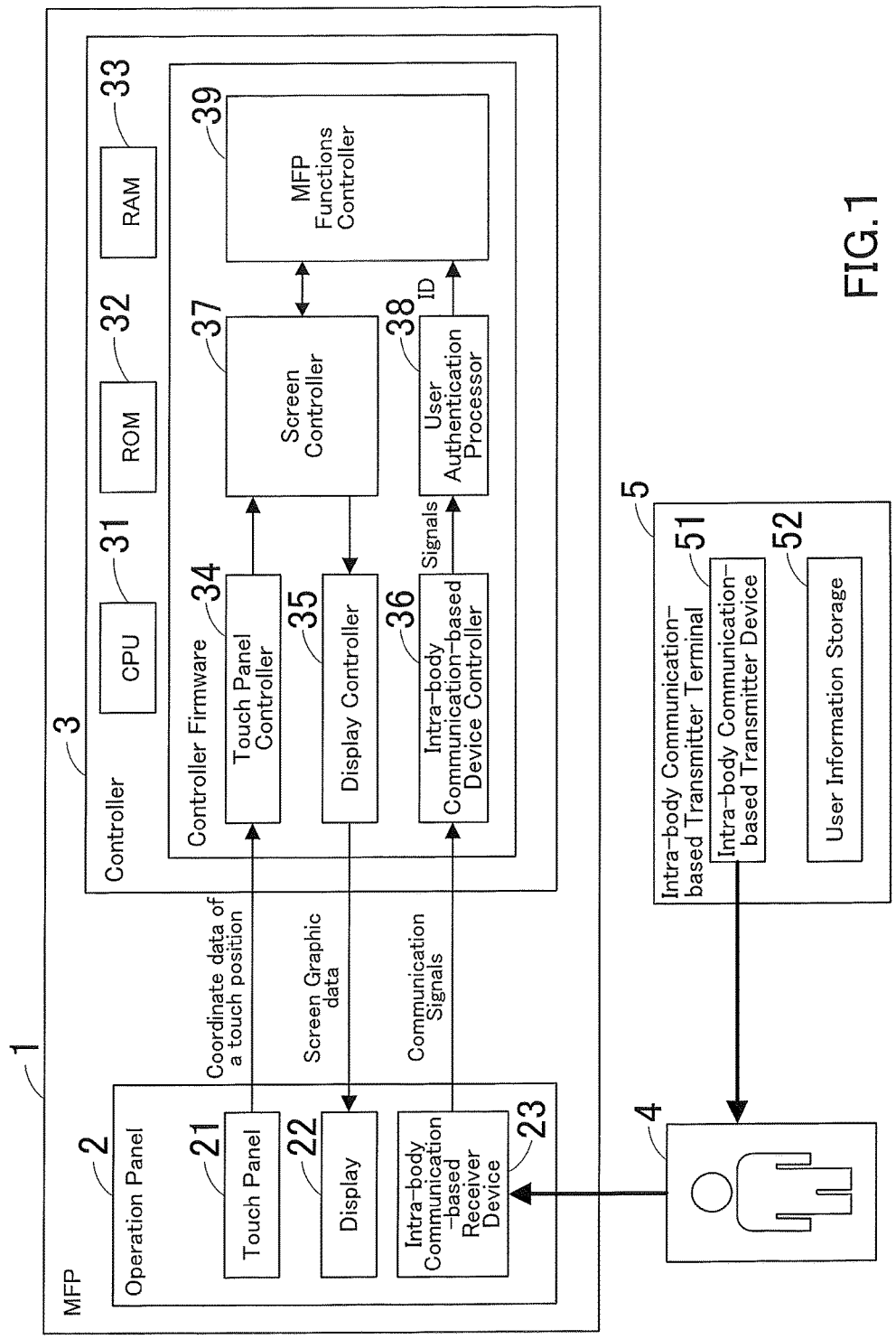
FIG. 1 is a block diagram illustrating configurations of a firmware module and a user interface device loaded on an information processing apparatus according to one embodiment of the present invention.

FIG. 1 is a block diagram illustrating configurations of a firmware module and a user interface device loaded on a MFP 1, i.e., a multifunctional digital image processing apparatus as an example of an information processing apparatus according to one embodiment of the present invention, as described above.

It should be understood that information processing apparatuses are not necessarily limited to multifunctional digital image processing apparatuses and may be personal computers and tablet computer terminals as long as they implements user authentication.

As referred to in FIG. 1, the MFP 1 is provided with an operation panel 2 and a controller 3.

The operation panel 2 is provided with a display 22 consisting of a liquid-crystal display, for example, a touch panel 21 disposed on the surface of the display 22, and an intra-body communication-based receiver device 23.

The display 22 displays operation screens, including a lock screen, for users to operate the MFP 1 and messages and other information for users. The touch panel 21 receives touch gestures of users. It should be understood that touch gestures include swipe or slide gestures (moving an object), flick gestures, pinch gestures, and others.

When a user 4, who carries an intra-body communication-based transmitter terminal 5 that transmits radio signals in a user-specific form, touches the operation panel 21, the intra-body communication-based receiver device 23 receives the radio signals to obtain user information from the intra-body communication-based transmitter terminal 5. The intra-body communication receiver device 23 and the touch panel 21 are separately disposed on the display 22, in the form of layers.

The controller 3 is provided with a CPU 31 controlling the MFP 1 in a unified manner, a ROM 32 storing operation programs and other information for the CPU 31, and a RAM 33 providing a work area for the CPU 31 to execute processing in accordance with the operation programs.

From its functional aspects, the controller 3 is provided with a touch panel controller 34, a display controller 35, an intra-body communication-based device controller 36, a screen controller 37, a user authentication processor 38, and a MFP functions controller 39. The operations of these controllers are executed by the CPU 31, in accordance with firmware (FW).

The touch panel controller 34 controls the touch panel 21; it receives coordinate data of a user's touch position from the touch panel 21. The display controller 35 transmits screen graphic data to the display 22 to display various screens thereon.

The intra-body communication-based device controller 36 controls the intra-body communication-based receiver device 23; it receives communication signals by way of the intra-body communication-based receiver device 23. The screen controller 37 analyzes the coordinate received by the touch panel controller 34, generates screen graphic data on the basis of the coordinates of a touch position, then delivers the screen graphic data to the display controller 35.

The user authentication processor 38 conducts user identification and authentication by analyzing the communication signals received by the intra-body communication-based device controller 36 and searching user basic information stored in advance for a matched record. The user authentication processor 38 also transmits identification information (ID) of an identified user and other information to the MFP functions controller 39.

The MFP functions controller 39 controls all operations of the MFP 1 in a unified and systematic manner. Specifically, in this embodiment, when a user logs out, the MFP functions controller 39 locks the MFP 1 to put it in standby state and displays a lock screen indicating that the MFP 1 is presently locked, as a standby screen. Upon receiving an authentication result from the user authentication processor 38, the MFP functions controller 39 refers to permitted functions information of the user and, on the basis of the permitted functions information, conducts control such that the lock screen changes to a dedicated screen of the user. This will be later described in details.

The MFP 1 does not necessarily search user basic information stored on itself for a matched record: user basic information may be stored on an authentication server, not on the MFP 1. In this case, the MFP 1 transfers to the authentication server, user information obtained by the intra-body communication-based receiver device 23 and the authentication server searches the user basic information stored on itself for a matched record and returns a search result. Similarly, permitted functions information of authenticated users may be stored on the authentication server, not on the MFP 1; in this case, the MFP functions controller 39 obtains permitted functions information of the user from the authentication server.

The MFP 1 is operated by the user 4 who carries the intra-body communication-based transmitter terminal 5. The intra-body communication-based transmitter terminal 5 is provided with an intra-body communication-based transmitter device 51 and a user information storage 52.

The intra-body communication-based transmitter device 51 transmits signals having user information. It transmits radio signals to the MFP 1 by intra-body communication technology enabling communication through a human body as a communication medium and the intra-body communication-based receiver device 23 receives them. The user information storage 52 is a memory storing user information that is necessary to identify users, such as identification information that is user-specific.

In this embodiment, the MFP 1 has a lock function of locking the MFP 1 itself after user logout; the MFP 1 is in standby state while it is locked. A lock screen indicating that the MFP 1 is presently locked is initially displayed on the display 22 as illustrated in FIG. 2 and all touch gestures except for specified touch gestures including unlock gestures are disabled.

Figure 2:
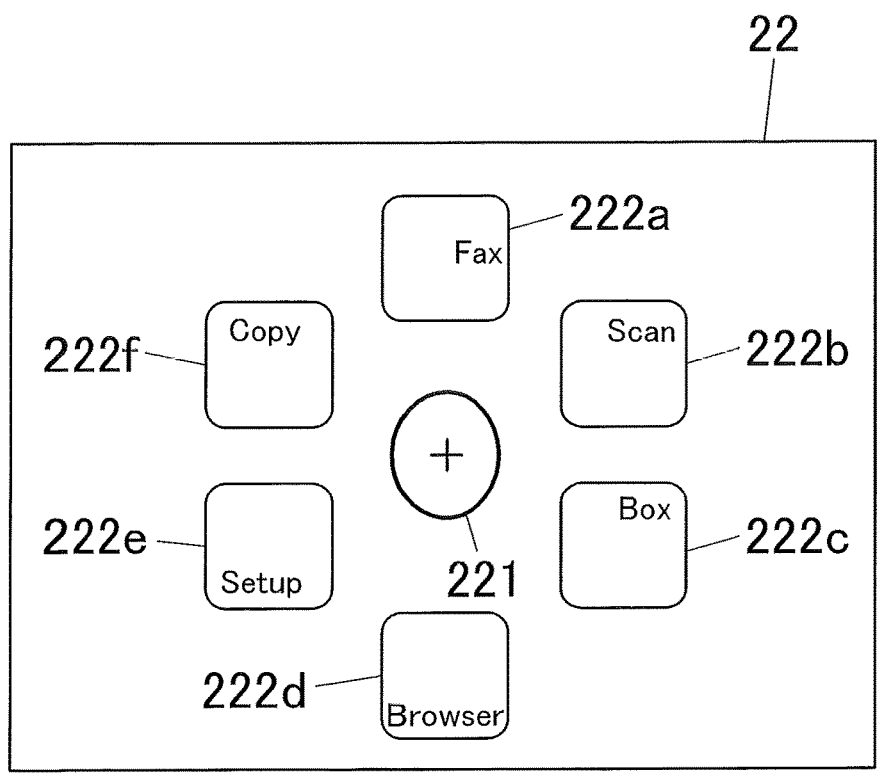
FIG. 2 illustrates a lock screen initially displayed on a display.

The following objects are displayed on the lock screen of FIG. 2. A first icon for unlock (also to be referred to as unlock icon) 221 is displayed at the center of the lock screen and one or more second icons (also to be referred to as function icons) 222a to 222f each representing a function of the MFP 1 are arranged around the unlock icon 221. When a user performs an unlock gesture on the lock screen initially displayed on the display 22, by touching the unlock icon 221 and moving to a desired one of the function icons 222a to 222f, the lock screen is refreshed such that the unlock icon 221 is present at a different position on the lock screen. Meanwhile, user authentication also starts with this unlock gesture; upon successful finish of user authentication, the lock screen changes to a dedicated screen of the authenticated user. When the user selects a function by leaving (releasing) the unlock icon 221 at the position where one of the function icons 222a to 222f is present, a main screen of the selected function is displayed.

The MFP 1 is not unlocked at a fixed timing but is unlocked at a predetermined timing after the unlock icon 221 starting to be moved. It is preferred that the MFP 1 be unlocked during a period from the unlock icon 221 starting to be moved until the unlock icon 221 being released on any of the function icons 222a to 222f. For example, the MFP 1 may be unlocked when the unlock icon 221 is released on any of the function icons 222a to 222f; alternatively, the MFP 1 may be unlocked upon successful finish of user authentication, i.e., when the lock screen changes to a dedicated screen of the authenticated user such that the unlock icon 221 is present at a different position. In this embodiment, the MFP 1 is configured to be unlocked when the unlock icon 221 is released on any of the function icons 222a to 222f.

As described above, users can finish unlocking, function selecting, and user authentication by taking only one gesture on the unlock icon 221. Users are not required to take an extra step for user authentication after unlocking, which will contribute to the user-friendliness.

Controlling screens on the display 22 upon an unlock gesture as described above will be hereinafter described in details with reference to the flowchart in FIG. 3 and the following flowcharts.

Figure 3:
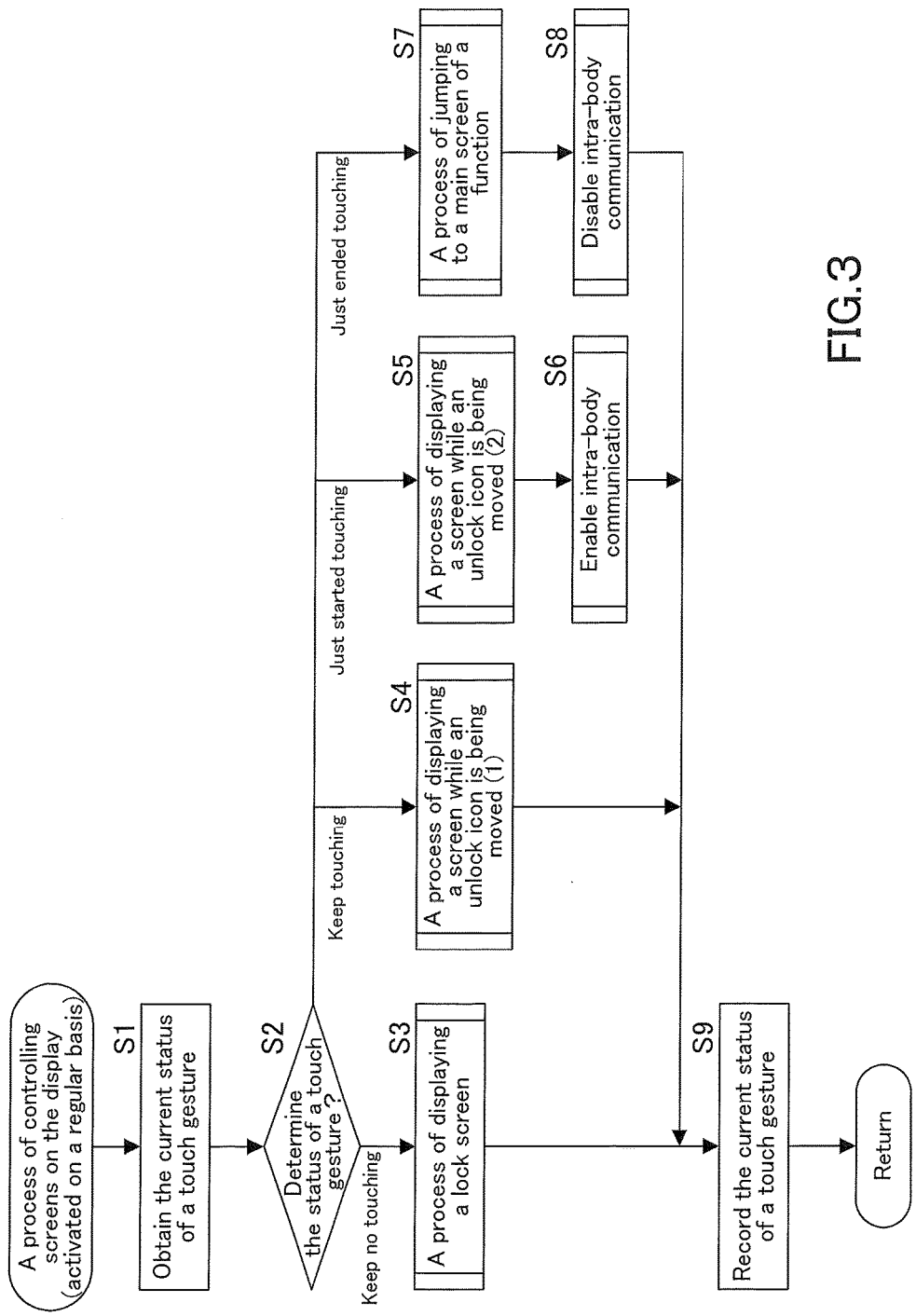
FIG. 3 is a flowchart representing a routine to be executed depending on the judgment whether or not a user touches a touch panel while a lock screen is displayed on the display.

FIG. 3 is a flowchart representing a routine to be executed depending on the judgment whether or not a user touches the touch panel 21 on a lock screen initially displayed on the display 22. The flowchart is activated on a regular basis.

The routine represented by the flowchart in FIG. 3 and the following flowcharts are executed by the CPU 31 of the MFP 1 in accordance with operation programs stored on a recording medium such as the ROM 32.

In Step S1, the status of a touch gesture is obtained; in Step S2, the status of a touch gesture is determined.

Figures 4, 5:
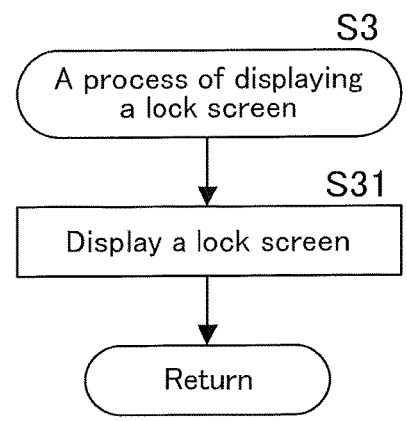
FIG. 4 is a table that contains criteria for determining the status of a touch gesture.
FIG. 5 is a flowchart representing a subroutine to be executed as a process of displaying a lock screen, Step S3 of the FIG. 3 flowchart.

The status of a touch gesture is determined on the basis of a combination of the previous and current statuses obtained in Step S1 as indicated in the table of FIG. 4. Specifically, the status of a touch gesture is determined to be "keep touching" in the case where the previous status is determined to be "touching" and the current status is also determined to be "touching" and the status of a touch gesture is determined to be "just ended touching" in the case where the previous status is determined to be "touching" and the current status is determined to be "no touching". The status of a touch gesture is determined to be "just started touching" in the case where the previous status is determined to be "no touching" and the current status is determined to be "touching" and the status of a touch gesture is determined to be "keep no touching" in the case where the previous status is determined to be "no touching" and the current status is also determined to be "no touching".

Back to FIG. 3, the flowchart branches into different options depending on the status determined in Step S2. If the status of a touch gesture is determined to be "keep no touching", the flowchart proceeds to Step S3 to implement a process of displaying a lock screen. The flowchart then proceeds to Step S9. The process of displaying a lock screen will be later described in details.

If the status of a touch gesture is determined to be "keep touching", the flowchart proceeds to Step S4 to implement a process of displaying a screen while an unlock icon is being moved (1). The flowchart then proceeds to Step S9. The process of displaying an unlock icon being moved (1) will be later described in details.

If the status of a touch gesture is determined to be "just started touching", the flowchart proceeds to Step S5 to implement a process of displaying a screen while an unlock icon is being moved (2) and to Step S6 to set the status of intra-body communication to "enabled". The flowchart then proceeds to Step S9. The process of displaying an unlock icon being moved (2) will be later described in details.

If the status of a touch gesture is determined to be "at the end of touch", the flowchart proceeds to Step S7 to implement a process of jumping to a main screen of a function and to Step S8 to disable intra-body communication. The flowchart then proceeds to Step S9. The process of switching to a function screen will be later described in details.

The current status is recorded in Step S9; the flowchart then returns to the beginning.

FIG. 5 is a flowchart representing a subroutine to be executed as a process of displaying a lock screen, Step S3 of the FIG. 3 flowchart. In the process of displaying a lock screen, a lock screen initially displayed on the display 22 is kept being displayed in Step S31. The flowchart then returns to the beginning.

Figure 6:
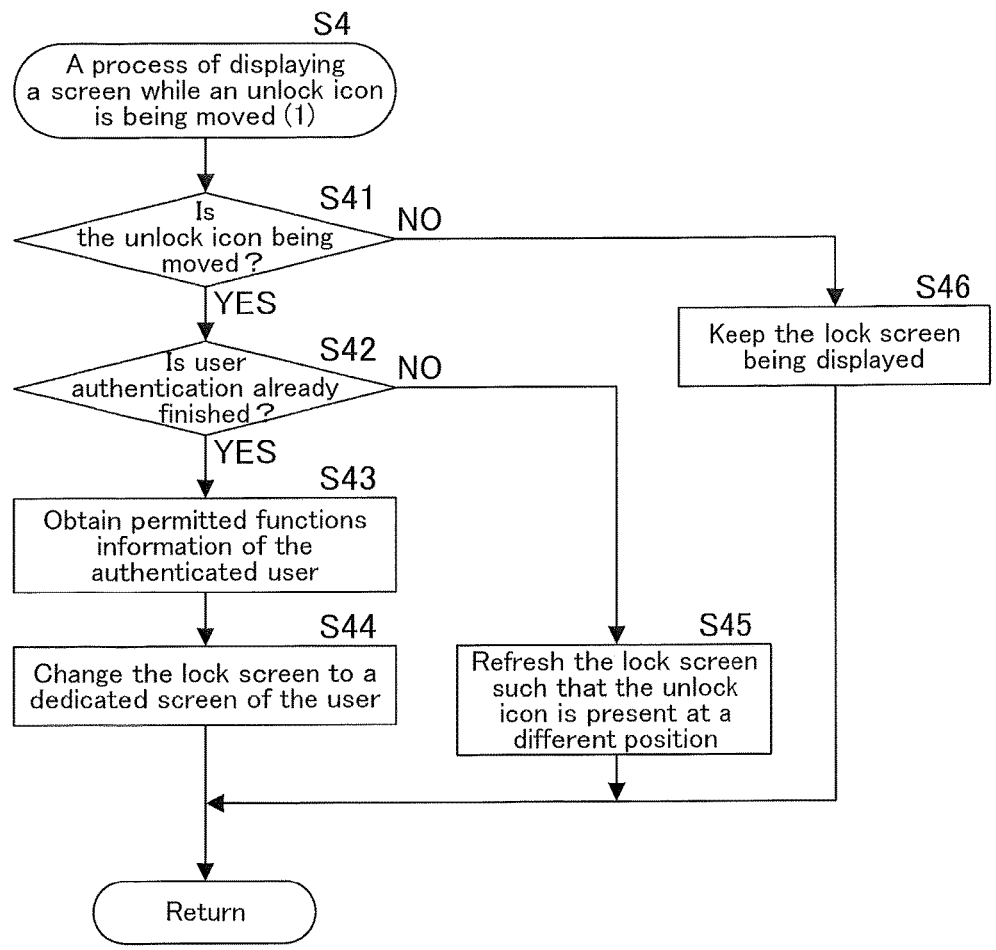
FIG. 6 is a flowchart representing a subroutine to be executed as a process of displaying a screen while an unlock icon is being moved (1), Step S4 of the FIG. 3 flowchart.

FIG. 6 is a flowchart representing a subroutine to be executed as a process of displaying a screen while an unlock icon is being moved (1), Step S4 of the FIG. 3 flowchart.

In Step S41, it is judged whether or not the unlock icon 221 is being moved. If the unlock icon 221 is not being moved (No in Step S41), the lock screen is kept being displayed in Step S46. If the unlock icon 221 is being moved (YES in Step S41), it is then judged in Step S42 whether or not user authentication is already finished. If user authentication is not finished yet (NO in Step S42), the lock screen is refreshed such that the unlock icon 221 is present at a different position on the lock screen in Step S45. The flowchart then returns to the beginning.

If user authentication is already finished (YES in Step S42), permitted functions information of the authenticated user is obtained in Step S43 and the lock screen changes to a dedicated screen of the authenticated user in Step S44. The flowchart then returns to the beginning. The dedicated screen of the user will be later described in details.

Figure 7:
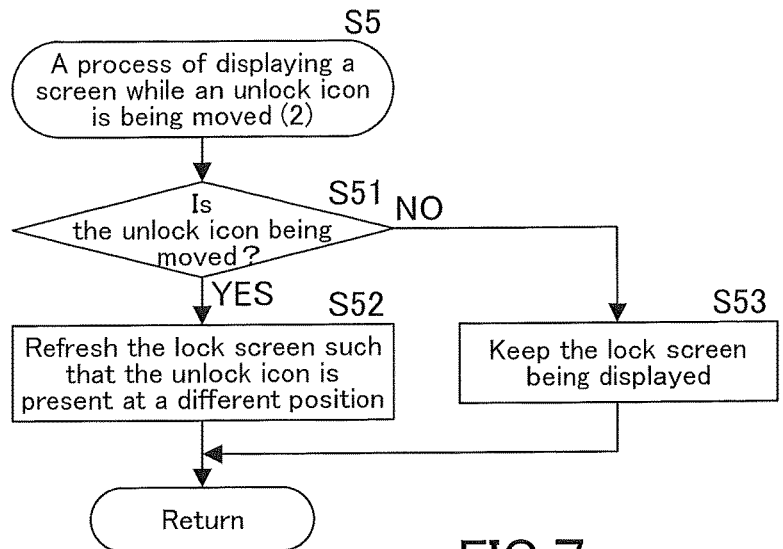
FIG. 7 is a flowchart representing a subroutine to be executed as a process of displaying a screen while an unlock icon is being moved (2), Step S5 of the FIG. 3 flowchart.

FIG. 7 is a flowchart representing a subroutine to be executed as a process of displaying a screen while an unlock icon is being moved (2), Step S5 of the FIG. 3 flowchart.

In Step S51, it is judged whether or not the unlock icon 221 is being moved. If it is being moved (YES in Step S51), the lock screen is refreshed such that the unlock icon 221 is present at a different position on the lock screen in Step S52. The flowchart then returns to the beginning. If it is not being moved (NO in Step S51), the lock screen initially displayed on the display 22 is kept being displayed in Step S53. The flowchart then returns to the beginning.

Figure 8:
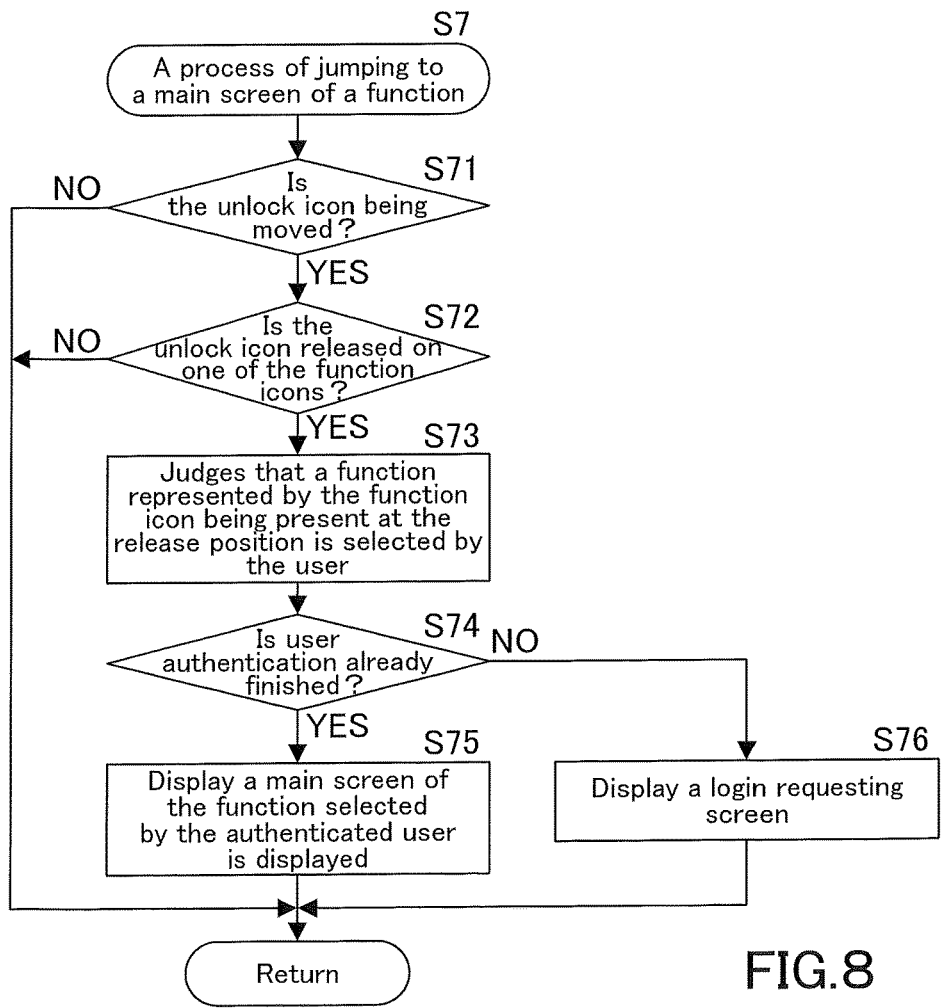
FIG. 8 is a flowchart representing a subroutine to be executed as a process of jumping to a main screen of a function, Step S7 of the FIG. 3 flowchart.

FIG. 8 is a flowchart representing a subroutine to be executed as a process of jumping to a main screen of a function, Step S7 of the FIG. 3 flowchart.

In Step S71, it is judged whether or not the unlock icon 221 is being moved. If it is being moved (YES in Step S71), it is then judged in Step S72 whether or not the unlock icon 221 is released on one of the function icons 222a to 222f. If the unlock icon 221 is released on one of the function icons 222a to 222f (YES in Step S72), a function represented by the function icon being present at the release position is recognized as being selected by the user in Step S73.

Subsequently, in Step S74, it is judged whether or not user authentication is already finished. If user authentication is already finished (YES in Step S74), a main screen of the function selected by the authenticated user is displayed in Step S75. The flowchart then returns to the beginning. If user authentication is not finished yet (NO in Step S74), a login requesting screen is displayed in Step S76. The flowchart then returns to the beginning.

The flowchart returns to the beginning in the following cases: where the unlock icon 221 is not being moved in Step S71 (NO in Step S71); and where the unlock icon 221 is not released on one of the function icons 222a to 222f in Step S72 (NO in Step S72).

Figure 9:
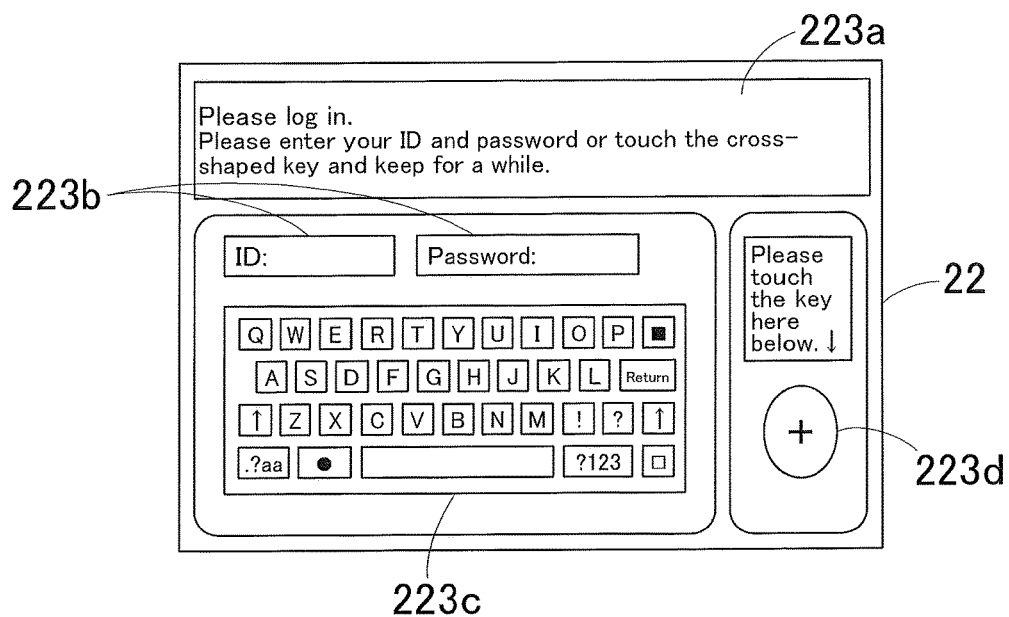
FIG. 9 illustrates a login requesting screen.

FIG. 9 illustrates the login requesting screen. Displayed in the login requesting screen are the following objects: a message 223a requesting to enter user information such as identification information and a password and requesting to perform a long touch gesture on a login key 223d indicated by a predetermined symbol; a user information entry field 223b; and a software keyboard 223c. When a user enters user information or performs a long touch gesture on the login key 223d, user authentication is conducted again. Specifically, when a user performs a long touch gesture on the login key 223d, the intra-body communication transmitter terminal 5 transmits user information to the MFP 1 via the intra-body communication device 23 by intra-body communication technology and the MFP 1 conducts user authentication with the user information obtained therefrom. Once user authentication by intra-body communication technology is finished, the authentication result is effective even during key entry.

Figure 10:
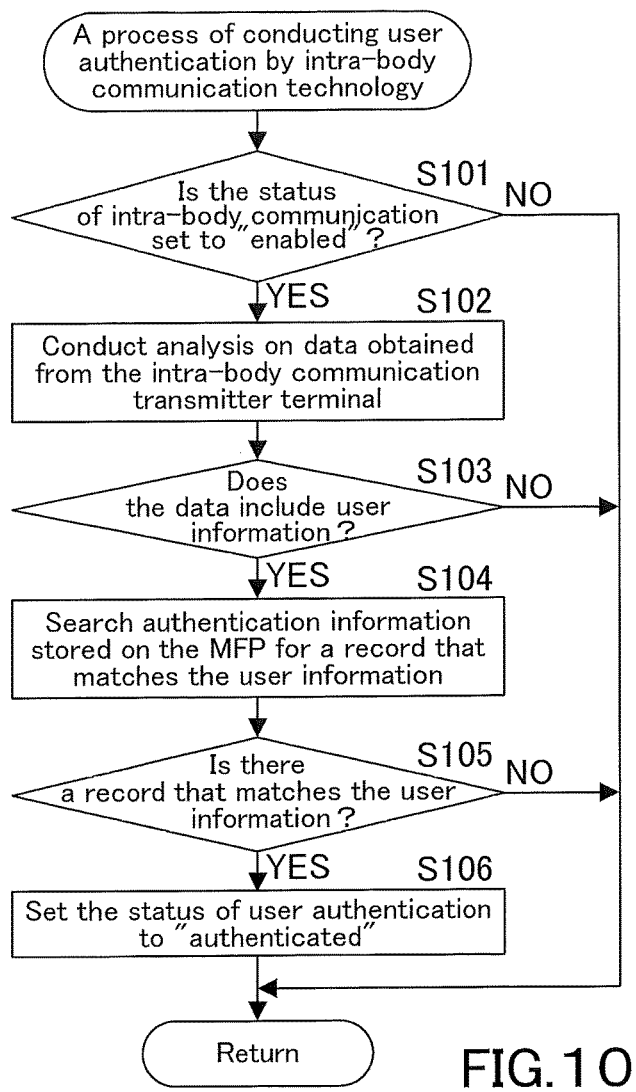
FIG. 10 is a flowchart representing a process of conducting user authentication by intra-body communication technology.

FIG. 10 is a flowchart representing a process of conducting user authentication by intra-body communication technology. In this process, user authentication is conducted with user information obtained from the intra-body communication transmitter terminal 5 by intra-body communication technology. The flowchart is activated on a regular basis.

In Step S101, it is judged whether or not the status of intra-body communication is "enabled". If it is "enabled" (YES in Step S101), analysis is conducted on data obtained from the intra-body communication transmitter terminal 5 by intra-body communication technology in Step S102 and it is then judged in Step S103 whether or not the data includes user information.

If the data includes user information (YES in Step S103), user basic information (authentication information) stored on the MFP 1 is searched for a record that matches the user information in Step S104 and it is then judged in Step S105 whether or not there is a record that matches the user information. If there is a matched record (YES in Step S105), the status of user authentication is set to "authenticated" and a notice of permitted functions for the authenticated user is obtained in Step S106. The flowchart then returns to the beginning.

The flowchart immediately returns to the beginning in the following cases: where the status of intra-body communication is not "enabled" in Step S101 (NO in Step S101); where the data does not include user information in Step S103 (NO in Step S103); and where there is not a record that matches the user information in Step S105 (NO in Step S105).

Figure 11:
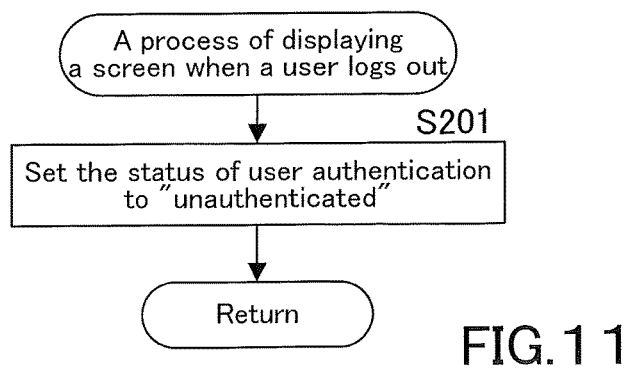
FIG. 11 is a flowchart representing a process of displaying a screen when user a user logs out.

FIG. 11 is a flowchart representing a process of displaying a screen when a user logs out. When a user logs out, the status of user authentication is set to "unauthenticated" in Step S201. The flowchart then returns to the beginning. When a user logs out, the MFP 1 is locked to fall in standby state; the MFP 1 initially displays a lock screen.

Hereinafter, the user's dedicated screen displayed on the display 22 in Step S44 of FIG. 6 will be described in details.

Figure 12A:
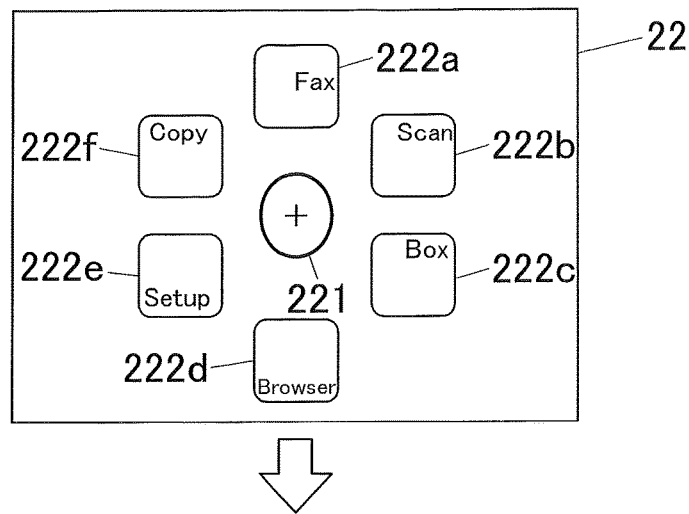
FIGS. 12A, 12B, and 12C illustrate an example of a user's dedicated screen to be displayed on the display.
Figure 12B:
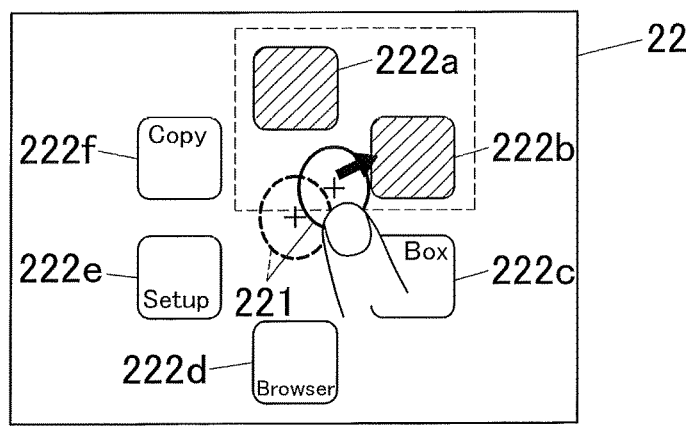

In the example of FIG. 12, when the user touches and moves the unlock icon 221 on the lock screen initially displayed on the display 22 as illustrated in FIG. 12A, the lock screen is refreshed such that the unlock icon 221 is present at a different position on the lock screen. Upon successful finish of user authentication, the function icons 222a and 222b each representing a prohibited function for the authenticated user (facsimile function and scanner function, in this example) are displayed in a different color, for example, in a grayout manner as illustrated in FIG. 12B, although the function icons 222a and 222b are actually highlighted by hatching in FIG. 12B for the sake of explanation. As described above, the function icons 222a and 222b are displayed in a different color. This allows users to ensure good visibility of their prohibited functions in order to avoid selecting them accidentally, which will contribute to the user-friendliness.

The function icons 222a and 222b each representing a prohibited function may be displayed in a different shape or at a different position, not in a different color. In other words, the function icons 222a and 222b may be displayed in a different manner: for example, in a different color, in a different shape, at a different position, or by a combination of two or all of the foregoing. Alternatively, the function icons 222c to 222f each representing a permitted function may be displayed in a different manner, instead of the function icons 222a and 222b each representing a prohibited function.

Figure 12C:
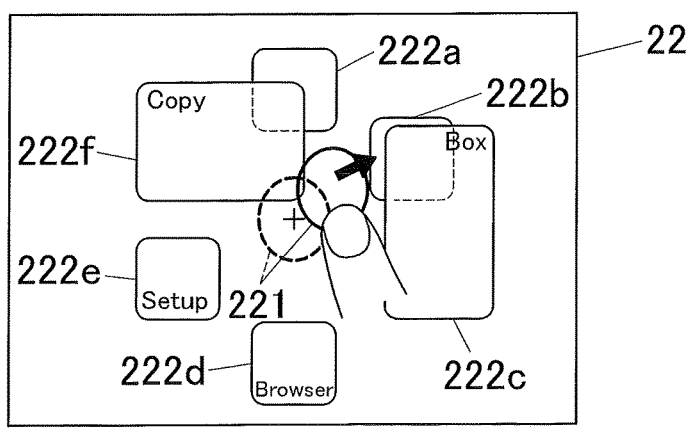

Still alternatively, function icons each representing a permitted function (the function icons 222c and 222f, for example) may be displayed in an enlarged size such that they overlap with the function icons 222a and 222b each representing a prohibited function as illustrated in FIG. 12C. With the function icons 222c to 222f displayed in an enlarged size, users can ensure a room in a limited display area, which is large enough to release the unlock icon 221 therein. This will further contribute to the user-friendliness.

It is preferred that the lock screen be changed to a dedicated screen of the user animatedly and slowly in conjunction with the unlock icon 221 being moved; with the animation display, users can continue manipulating comfortably.

Figure 13:
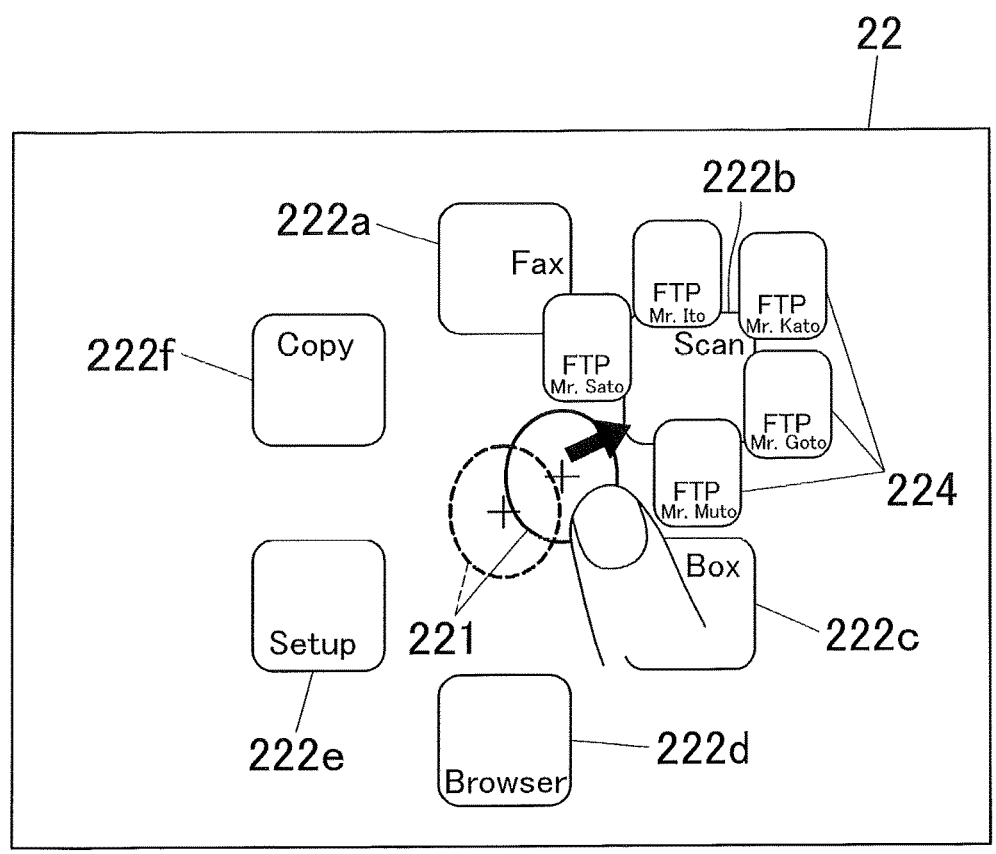
FIG. 13 illustrates another example of a user's dedicated screen to de displayed.

FIG. 13 illustrates another example of a user's dedicated screen to be displayed. After selecting a function by releasing the unlock icon 221 on one of the function icons, users may need to configure settings on a main screen of the function. For example, after selecting scanner function, users may need to select an address on a main screen of scanner function to transmit image data. It would be desirable to finish these steps by taking only one gesture, from the aspect of user-friendliness.

In such a desirable configuration, upon finish of user authentication, subordinate icons 224 each representing the user's available option of the user's most likely intended function (scanner function represented by the function icon 222b, for example) are displayed on a dedicated screen of the user. In the example of FIG. 13, a plurality of address icons 224 each representing the user's available scan-to address of scanner function that is most likely intended by the user are arranged around the function icon 222b representing scanner function, as subordinates to the function icon 222b, in a selectable manner. When a user selects a desired scan-to address by releasing the unlock icon 221 on one of the address icons 224, the lock screen jumps to a main screen of scanner function on which the selected scan-to address is already filled in. Scan-to address information is obtained along with permitted functions information at the time of user authentication.

In this configuration, users can finish unlocking, user authentication, and settings of a function represented by one of the function icons 222a to 222f, by taking only one gesture, which will contribute to the user-friendliness. In this embodiment, the MFP 1 is unlocked when the unlock icon 221 is released on one of the address icons 224.

Alternatively, it may be configured as described below. If user authentication is not finished while the unlock icon 221 is being moved, the subordinate icons 224 each representing a general option of the user's most likely intended function among those represented by the function icons 222a to 222f are displayed; upon finish of user authentication, the subordinate icons 224 each representing the user's available option of the user's most likely intended function are displayed.

Figure 14A:
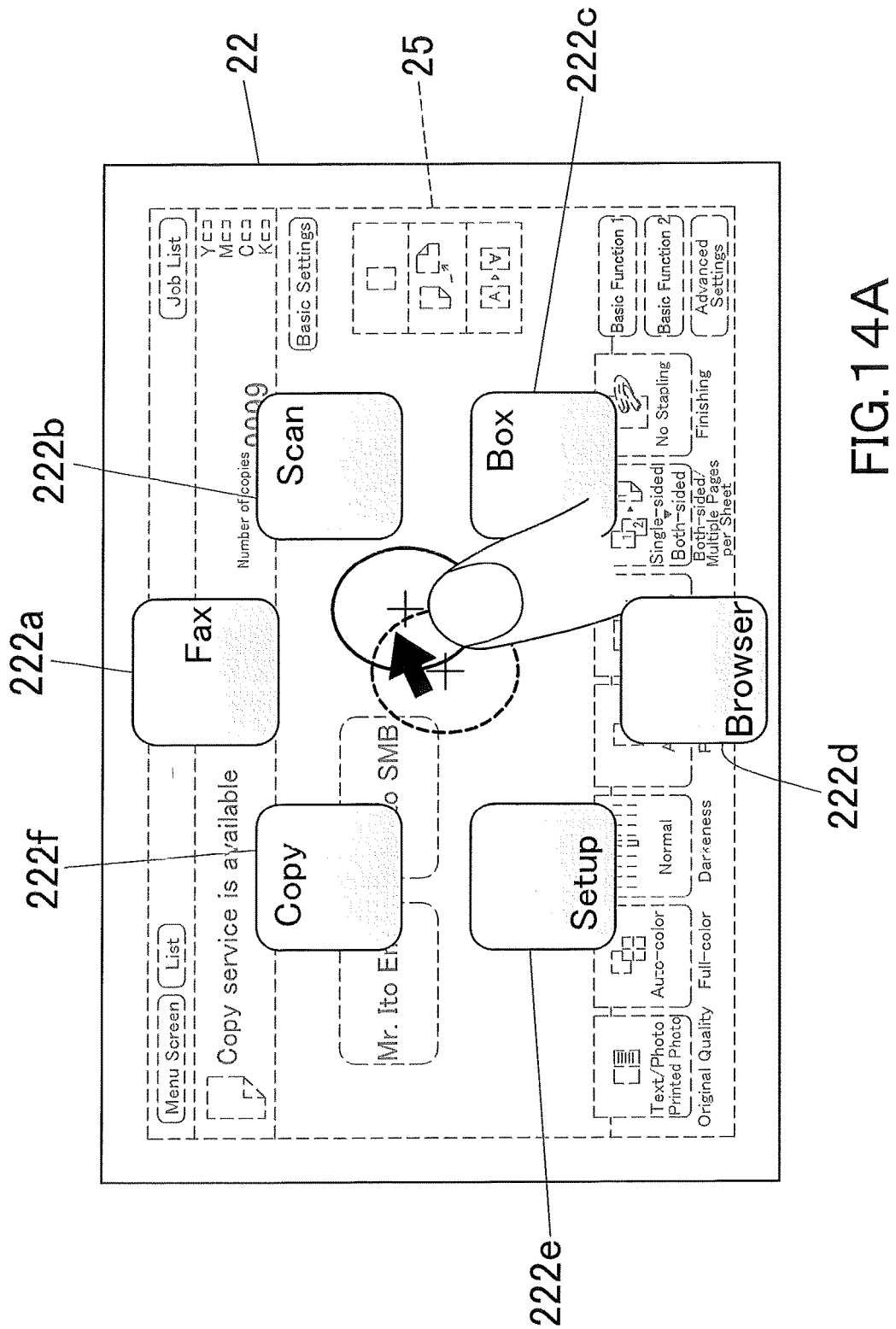
FIGS. 14A, 14B, and 14C illustrate yet another example of a user's dedicated screen to be displayed.

FIG. 14 illustrates yet another example of a user's dedicated screen to be displayed. For light users of the MFP 1, there is sometimes a difference between the name of a function and a desired function. When a light user fails in selecting a desired function, he/she needs to take an extra step for deselecting and trying again.

In the example of FIG. 14, if user authentication is finished while the unlock icon 221 is being moved, a main screen of the user's most likely intended function is displayed in an opaque manner as a background image 25.

Figure 14B:
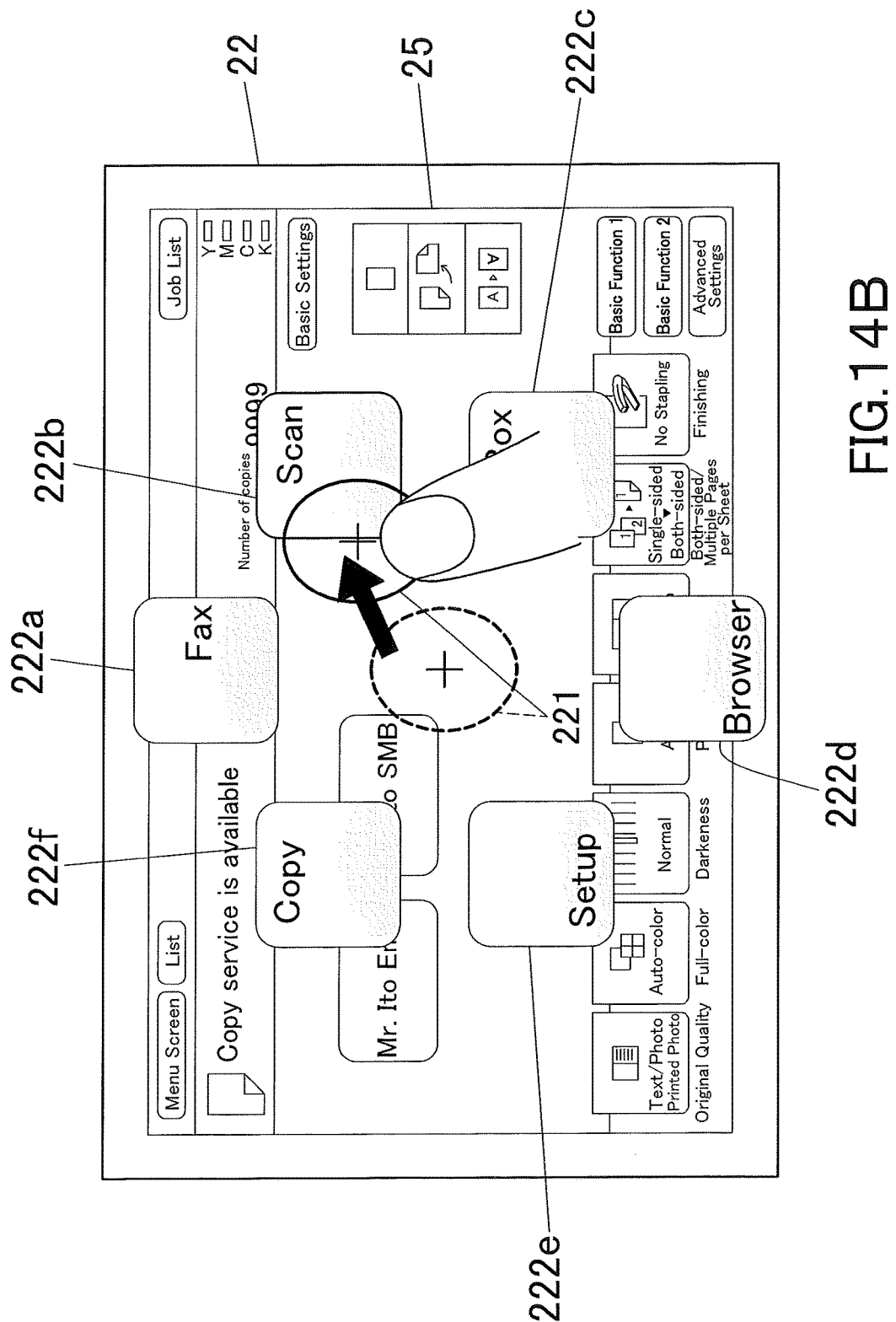
Figure 14C:
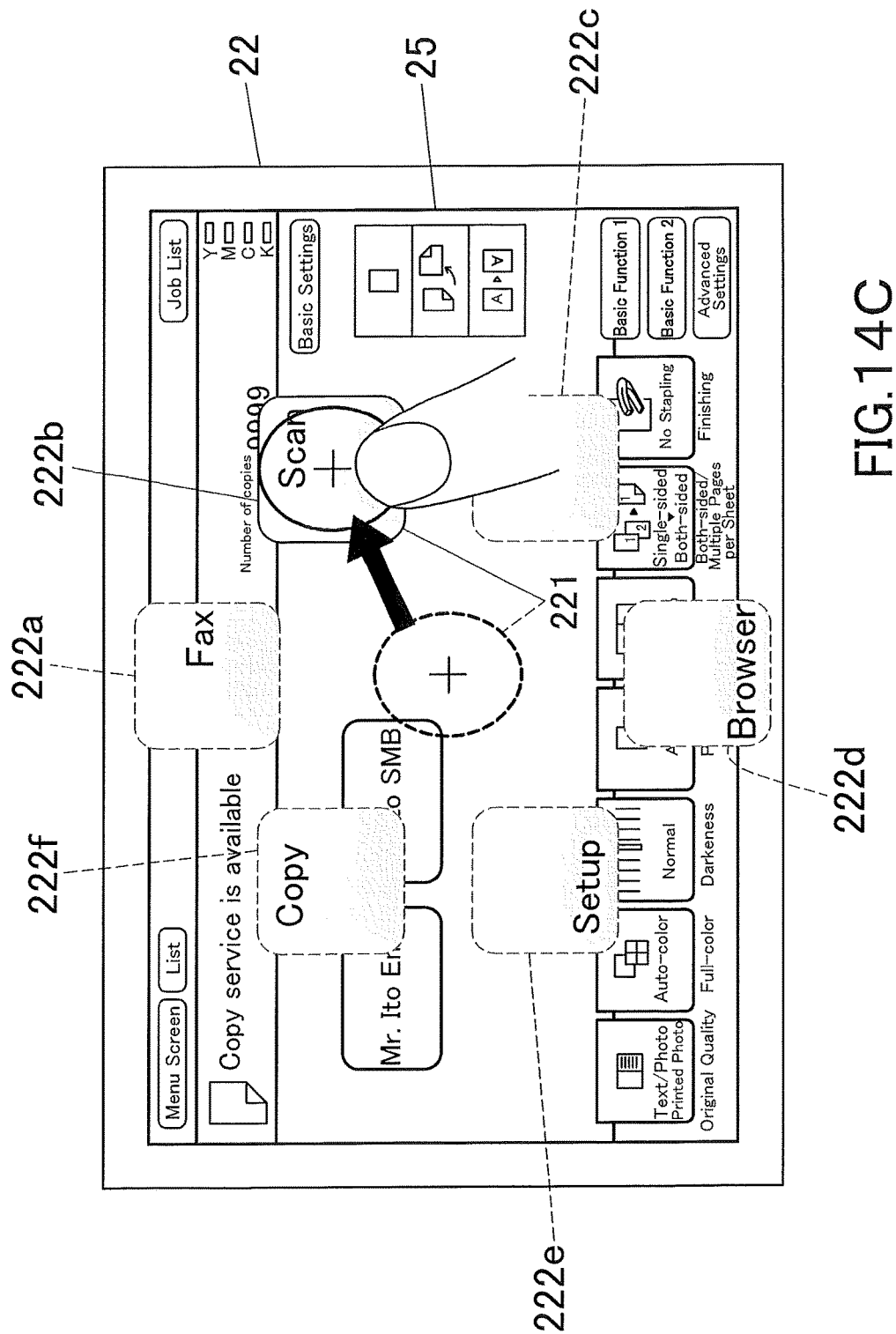

The opacity level of the background image 25 changes depending on the distance traveled by the unlock icon 221 being moved with a gesture: the background image 25 is displayed at a higher opacity level (more clearly) in proportion to the distance traveled by the unlock icon 221, as illustrated in FIGS. 14B and 14C. The background image 25 is illustrated by dashed lines in FIG. 14A, by solid lines in FIG. 14B, and by bold lines in FIG. 14C, in ascending order of clarity.

FIG. 15 is a table that determines opacity levels of the background image 25 and others depending on the distance traveled by the unlock icon 221. The background image 25 is displayed at an opacity level determined in the table of FIG. 15, by the CPU 31. In the table of FIG. 15, the distance traveled by the unlock icon 221 from the home position to a function icon representing a user's selected function (the function icon 222b, for example) is defined as X and the distance traveled by the unlock icon 221 from the home position to a position at which the unlock icon is currently present is defined as Y. The percentages of Y to X are grouped into the following five ranges: 0 to 24%, 25 to 49%, 50 to 74%, 75 to 124%, and more than 124%. Depending on the range, opacity levels of the function icons each representing a permitted function, the function icons each representing a prohibited function, and the background image 25 are determined. These objects are displayed most clearly at an opacity level of 100% and most obscurely at an opacity level of 0%.

Specifically, when the percentage of Y to X is within the range of 0 to 24%, in other words, when the unlock icon 221 is not moved or is moved only a short distance, the function icons each representing a permitted function are displayed at an opacity level of 100%, the function icons each representing a prohibited function are displayed at an opacity level of 100%, and the background image 25 is displayed in a grayout manner. When the percentage of Y to X is within the range of 25 to 49%, the function icons each representing a permitted function are displayed at an opacity level of 100%, the function icons each representing a prohibited function are displayed at an opacity level of 60%, and the background image 25 is displayed at an opacity level of 30%.

When the percentage of Y to X is within the range of 50 to 74%, the function icons each representing a permitted function are displayed at an opacity level of 100%, the function icons each representing a prohibited function are displayed at an opacity level of 30%, and the background image 25 is displayed at an opacity level of 60%. When the percentage of Y to X is within the range of 75 to 124%, the function icons each representing a permitted function are displayed at an opacity level of 100%, the function icons each representing a prohibited function are displayed at an opacity level of 10%, and the background image 25 is displayed at an opacity level of 90%. When the percentage of Y to X is within the range of more than 124%, the function icons each representing a permitted function are displayed at an opacity level of 100%, the function icons each representing a prohibited function are displayed at an opacity level of 100%, and the background image 25 is displayed in a grayout manner.

As described above, the background image 25 is displayed in an opaque manner such that the function icons 222a to 222f stand out against a background and the opacity level of the background image 25 changes depending on the distance traveled by the unlock icon 221 being moved with a gesture. This allows users to ensure good visibility of the most likely intended function among those represented by the function icons 222a to 222f in order to avoid selecting an unintended function accidentally.

Figure 16:
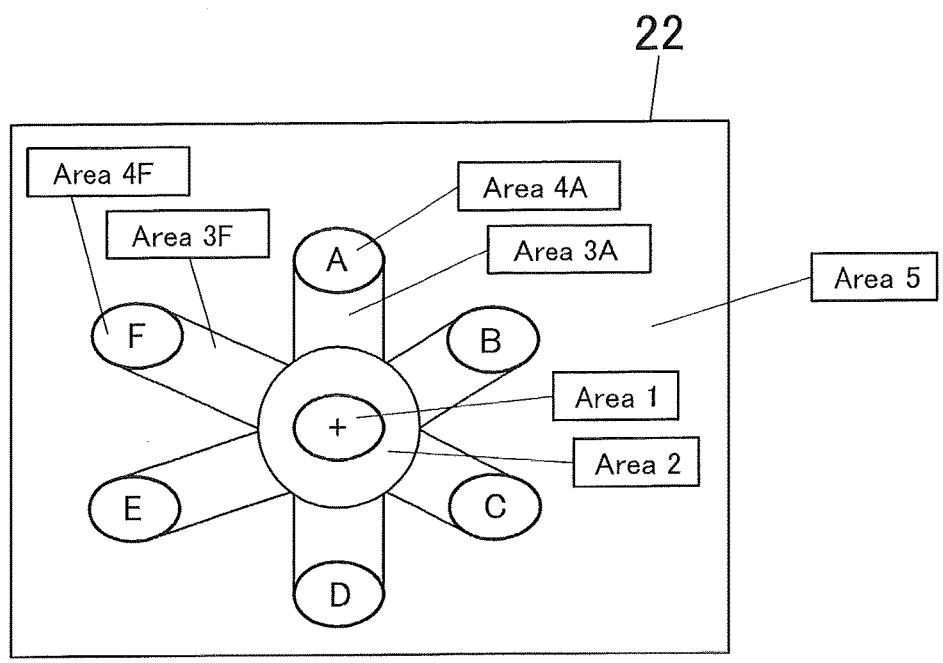
FIG. 16 is an explanatory view of areas being present on the lock screen.

FIGS. 16 and 17 are drawings for describing a predetermined configuration that determines different screens as described above depending on the status of a touch gesture on the unlock icon 221, the position of the unlock icon 221, the status of user authentication, and others. The screens can be displayed on the display 22 in accordance with this configuration, by the CPU 31.

As illustrated in FIG. 16, the following areas are present on the lock screen displayed on the display 22: "area 1" is an area for the home position of the unlock icon 221, "area 2" is a peripheral part of the area 1, "areas 4A to 4F" are areas A to F for the function icons 222a to 222f, "areas 3A to 3F" are areas as pathways on which the unlock icon 221 can be moved to the function icons 222a to 222f, and "area 5" is an area other than those corresponding to the areas 1 to 4. Different screens are determined in FIG. 17 depending on the area in which the unlock icon is present.

FIG. 17A is a table that determines a user's dedicated screen as illustrated in FIG. 12. A lock screen initially displayed on the display 22 is kept being displayed without the unlock icon 221 being touched. When the unlock icon 221 is touched and moved to any of the areas 1 to 5 by an unauthenticated user, the lock screen is refreshed such that the unlock icon 221 is present at a different position thereon. In this example, "area 3(n)" is an area to be selected by the user among the areas 3A to 3F and "area 4(n)" is an area to be selected by the user among the areas 4A to 4F. When the unlock icon 221 is touched and moved to any of the areas 1, 2, and 5 by an authenticated user, the lock screen is refreshed such that the unlock icon 221 is present at a different position thereon. When it is touched and moved to the area 3(n) or 4(n) by an authenticated user, the lock screen changes to a dedicated screen of the user as illustrated in FIG. 12.

When the unlock icon 221 is released on any of the areas 1, 2, 3(n) and 5 by a user, the lock screen is kept being displayed regardless of whether or not it is an authenticated user. When it is released in the area 4(n) by an authenticated user, the lock screen jumps to a main screen of the selected function. When it is released in the area 4(n) by an unauthenticated user, the lock screen jumps to a login requesting screen as illustrated in FIG. 9.

FIG. 17B is a table that determines a user's dedicated screen as illustrated in FIG. 13. A lock screen initially displayed on the display 22 is kept being displayed without the unlock icon 221 being touched. When the unlock icon 221 is touched and moved to any of the areas 1, 2, and 5 by a user, the lock screen is refreshed such that the unlock icon 221 is present at a different position thereon regardless of whether or not it is an authenticated user.

When the unlock icon 221 is touched and moved to the area 3(n) or 4(n) by an unauthenticated user, the lock screen is refreshed such that the unlock icon 221 is present at a different position and the subordinate icons 224 each representing a general option of the user's most likely intended function (n) are displayed thereon. When it is touched and moved to the same by an authenticated user, the lock screen is refreshed such that the unlock icon 221 is present at a different position and the subordinate icons 224 each representing the user's available option of the user's most likely intended function (n) are displayed thereon as illustrated in FIG. 13.

When the unlock icon 221 is released on any of the areas 1, 2, 3(n) and 5 by a user, the lock screen is kept being displayed regardless of whether or not it is an authenticated user. When it is released on any of the function icons 222a to 222f in the area 4(n) by an authenticated user, the lock screen jumps to a main screen of the selected function. When it is released on any of the subordinate icons 224 in the area 4(n) by an authenticated user, the lock screen jumps to a main screen of the selected function on which the selected option is already filled in. When it is released in the area 4(n) by an unauthenticated user, the lock screen jumps to a login requesting screen as illustrated in FIG. 9 and the subordinate icons 224 each representing a general option of the user's most likely intended function (n) are kept being displayed in a selectable manner behind the login requesting screen.

FIG. 17C is a table that determines a user's dedicated screen as illustrated in FIG. 14. A lock screen initially displayed on the display 22 is kept being displayed without the unlock icon 221 being touched. When the unlock icon 221 is touched and moved to any of the areas 1 to 5 by an unauthenticated user, the lock screen is refreshed such that the unlock icon 221 is present at a different position thereon. When the unlock icon 221 is touched and moved to any of the areas 1, 2, and 5 by an authenticated user, the lock screen is refreshed such that the unlock icon 221 is present at a different position thereon. When it is touched and moved to the area 3(n) or 4(n) by an authenticated user, the lock screen changes to the background image 25 as a dedicated screen of the user as illustrated in FIG. 14. As described above, the opacity level changes depending on the position of the unlock icon 221.

When the unlock icon 221 is released on any of the areas 1, 2, 3(n) and 5 by a user, the lock screen is kept being displayed regardless of whether or not it is an authenticated user. When it is released in the area 4(n) by an authenticated user, the lock screen jumps to a main screen of the selected function. When it is released in the area 4(n) by an unauthenticated user, the lock screen jumps to a login requesting screen as illustrated in FIG. 9.

One of the dedicated screens of FIGS. 12 to 14 may be displayed by default; an administrator or users may select one of them.

While one embodiment of the present invention has been described in details herein it should be understood that the present invention is not limited to the above-described embodiment. For example, user information is obtained by intra-body communication technology without the need of user input in this embodiment. Since the present invention is not limited thereto, user information alternatively may be obtained by wireless communication technology from a recording medium that is carried by a user, for example, an IC card.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An information processing apparatus comprising:
a touch-enabled display;
a lock portion that puts the information processing apparatus in standby state and disables all touch gestures except for specified touch gestures including unlock gestures, by locking the information processing apparatus;
a display controller that performs the following operations: initially displaying a lock screen on the display, the lock screen indicating that the information processing apparatus is presently locked, the lock screen having a first icon for unlock and one or more second icons each representing a function of the information processing apparatus; and refreshing the lock screen initially displayed on the display such that the first icon is present at a different position on the lock screen, when a user moves the first icon on the display;
an unlock portion that unlocks the information processing apparatus based on touching and moving the first icon on the lock screen by the user;
a recognition portion that recognizes a function as being selected by the user, the function being represented by the one second icon or one of the second icons being adjacent to the position where the user releases the first icon;
a user information obtaining portion that obtains user information for identifying the user; and
an authentication portion that conducts user authentication on the user with the user information obtained by the user information obtaining portion, while the user is moving the first icon,
wherein:
the display controller changes the lock screen on the display to a dedicated screen of the user if user authentication is finished by the authentication portion while the user is moving the first icon;
the dedicated screen of the user is a screen to be displayed when the user selects a function represented by the one second icon or one of the second icons, the one second icon or the one of the second icons being adjacent to the position where the user releases the first icon; and
the dedicated screen of the user is refreshed in sync with the position of the first icon moved by the user.

2. The information processing apparatus as recited in claim 1, wherein the user information obtaining portion obtains the user information from an intra-body communication terminal carried out by the user, by intra-body communication technology enabling communication through a human body as a communication medium.

3. The information processing apparatus as recited in claim 1, wherein the display controller changes the lock screen to the dedicated screen to display the one or more second icons in a different manner from those on the lock screen.

4. The information processing apparatus as recited in claim 3, wherein, if there is a prohibited function for the authenticated user, the display controller changes the lock screen to the dedicated screen to display the one second icon or one of the second icons in a different manner from that on the lock screen, the one second icon or the one of the second icons representing the prohibited function.

5. The information processing apparatus as recited in claim 3, wherein displaying in a different manner indicates displaying in a different color, in a different shape, at a different position, or by a combination of two or all of the foregoing.

6. The information processing apparatus as recited in claim 3, wherein, if there is a prohibited function for the authenticated user, the display controller changes the lock screen to the dedicated screen to display one or more of the second icons in a larger size than that on the lock screen, the one or more of the second each icons representing a permitted function for the authenticated user.

7. The information processing apparatus as recited in claim 1, wherein the display controller further displays a third icon on the display while the user is moving the first icon, the third icon representing a function setting related to the one or more second icons.

8. The information processing apparatus as recited in claim 7, wherein the third icon represents a specific function setting for the authenticated user.

9. The information processing apparatus as recited in claim 1, wherein the display controller reflects the dedicated screen to a background image.

10. The information processing apparatus as recited in claim 9, wherein the background image is a main screen of a function, the function being most likely intended by the user releasing the first icon on the one second icon or one of the second icons.

11. The information processing apparatus as recited in claim 10, wherein the display controller displays the background image in an opaque manner and changes the opacity level of the background image depending on the distance traveled by the first icon being moved.

12. The information processing apparatus as recited in claim 1, wherein the unlock portion unlocks the information processing apparatus at a predetermined timing until the user releases the first icon at the position where the one second icon or one of the second icons is present.

13. The information processing apparatus as recited in claim 12, wherein, if user authentication is not finished by the authentication portion until the user releases the first icon a position adjacent to the one second icon or one of the second icons, the display controller displays a user authentication requesting screen on the display after the user releases the first icon.

14. The information processing apparatus as recited in claim 1, wherein the authentication portion conducts user authentication on the user when the user starts moving the first icon.

15. A display control method of controlling a lock screen displayed, the display control method to be implemented by an information processing apparatus comprising a touch-enabled display, the display control method comprising:
putting the information processing apparatus in standby state and disable all touch gestures except for specified touch gestures including unlock gestures, by locking the information processing apparatus;
performing the following operations: initially displaying a lock screen on the display, the lock screen indicating that the information processing apparatus is presently locked, the lock screen having a first icon for unlock and one or more second icons each representing a function of the information processing apparatus; and refreshing the lock screen initially displayed on the display such that the first icon is present at a different position on the lock screen, when a user moves the first icon on the display;

unlocking the information processing apparatus based on touching and moving the first icon on the lock screen by the user;

recognizing a function as being selected by the user, the function being represented by the one second icon or one of the second icons being adjacent to the position where the user releases the first icon;

obtaining user information for identifying the user; and conducting user authentication on the user with the user information being obtained, while the user is moving the first icon, wherein:

the lock screen on the display changes to a dedicated screen of the user if user authentication is finished while the user is moving the first icon;

the dedicated screen of the user is a screen to be displayed when the user selects a function represented by the one second icon or one of the second icons, the one second icon or the one of the second icons being adjacent to the position where the user releases the first icon; and the dedicated screen of the user is refreshed in sync with the position of the first icon moved by the user.

16. A non-transitory computer-readable recording medium storing a display control program for an information processing apparatus comprising a touch-enabled display, the display control program for making a CPU of the information processing apparatus execute:

putting the information processing apparatus in standby state and disable all touch gestures except for specified touch gestures including unlock gestures, by locking the information processing apparatus;

performing the following operations: initially displaying a lock screen on the display, the lock screen indicating that the information processing apparatus is presently locked, the lock screen having a first icon for unlock and one or more second icons each representing a function of the information processing apparatus; and refreshing the lock screen initially displayed on the display such that the first icon is present at a different position on the lock screen, when a user moves the first icon on the display display;

unlocking the information processing apparatus based on touching and moving the first icon on the lock screen by the user;

recognizing a function as being selected by the user, the function being represented by the one second icon or one of the second icons being adjacent to the position where the user releases the first icon;

obtaining user information for identifying the user; and conducting user authentication on the user with the user information being obtained, while the user is moving the first icon, wherein the lock screen on the display changes to a dedicated screen of the user if user authentication is finished while the user is moving the first icon;

the dedicated screen of the user is a screen to be displayed when the user selects a function represented by the one second icon or one of the second icons, the one second icon or the one of the second icons being adjacent to the position where the user releases the first icon; and the dedicated screen of the user is refreshed in sync with the position of the first icon moved by the user.

* * * * *